United States Patent [19]

Mullet et al.

[11] Patent Number: 4,629,006
[45] Date of Patent: Dec. 16, 1986

[54] LAWN EDGER ATTACHMENT FOR TRACTORS

[75] Inventors: David L. Mullet, Hesston; Elmer D. Voth, Newton, both of Kans.

[73] Assignee: Excel Industries, Inc., Hesston, Kans.

[21] Appl. No.: 772,732

[22] Filed: Sep. 5, 1985

[51] Int. Cl.⁴ ........................................... A01D 34/84
[52] U.S. Cl. ..................................... 172/15; 172/305; 74/481; 56/256
[58] Field of Search .................. 172/297, 308, 305, 14, 172/15, 16, 303, 98, 99; 74/481; 56/256

[56] References Cited

U.S. PATENT DOCUMENTS

| | | | |
|---|---|---|---|
| 2,437,581 | 3/1948 | Wray | 172/297 X |
| 2,539,864 | 1/1951 | Rutherford | 172/305 |
| 2,601,380 | 6/1952 | Flory | 172/297 X |
| 2,630,052 | 3/1953 | Jory | 172/15 |
| 2,660,104 | 11/1953 | Rutherford | 172/305 |
| 2,906,080 | 9/1956 | Light | 172/14 |
| 4,046,200 | 9/1977 | Mullet | 172/14 |
| 4,200,155 | 4/1980 | Mullet | 172/14 |

Primary Examiner—Richard J. Johnson
Attorney, Agent, or Firm—John A. Hamilton

[57] ABSTRACT

A lawn edger attachment for tractors consisting of a base member adapted to be mounted at the side of a tractor, a boom universally pivoted to the base and angling laterally outwardly from the base, and a generally vertical rolling circular blade mounted beneath the outer end of the boom for rotation both on its own axis and about a generally vertical axis. A single manual operating handle operates to pivot the boom horizontally to position the blade directly above a division line between the grass of a lawn and an adjacent paved area, as the tractor is driven in a direction parallel to the division line, and to pivot the boom vertically, as may be necessary to rest the blade on the ground surface at the division line, and a foot pedal then supplies a mechanically multiplied force to press the blade downwardly to penetrate the ground.

11 Claims, 7 Drawing Figures

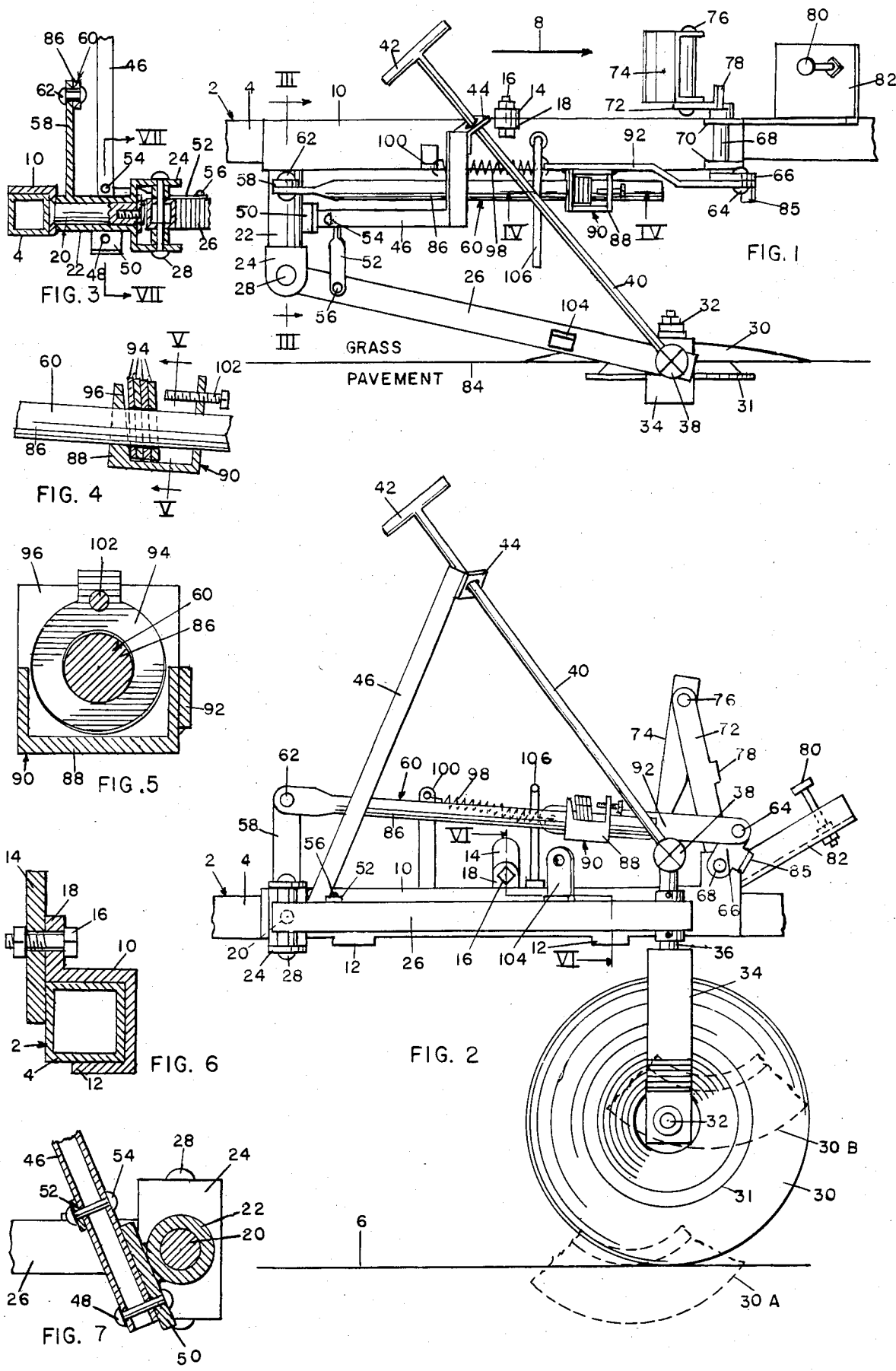

LAWN EDGER ATTACHMENT FOR TRACTORS

This invention relates to new and useful improvements in lawn edgers, which are devices for severing grass, and soil as well, which tends to extend over the surfaces of sidewalks, driveways and other paved areas, so as to improve the appearance and neatness of the lawn. The extending grass and soil cannot be severed by ordinary lawn mowers, especially since the grass tends to lie flat on the pavement, but once it has been severed by a lawn edger as described, it can be disposed of easily and conveniently by other means. The present edger is an improvement on that shown in prior U.S. Pat. No. 4,200,155, issued Apr. 29, 1980.

Objects of the present invention include the provision of a lawn edger attachment which may be attached removably to the side of nearly any tractor, usually but not necessarily a small "lawn and garden" tractor, in which the actual cutting tool. which constitutes a rolling coulter blade, may then be expeditiously moved to and from the side of the tractor to be aligned, in a vertical plane, with the division line between a paved area such as a sidewalk, driveway or the like, and a grass area, from either side of the division line, adjusted to the proper elevation, depending for example on whether the tractor is moving on the lawn or on the paved area, which may be lower than the lawn by the height of a curbing, then pressed firmly down into the soil at the edge of the pavement to the desired depth and locked at that elevation, and which then will follow the pavement edge accurately and automatically as the tractor is moved, despite variations in the lateral distance between the tractor and the division line, such variations being inevitable due to the difficulty of steering the tractor in a perfectly straight line. The edger shown in the above mentioned prior patent accomplishes certain of these functions, but in a comparatively complicated and expensive manner, requiring disassembly and reassembly for certain changes of function, and also requiring power operating means such as a hydraulic cylinder. The present edger requires no power operating means other than the motive power of the tractor itself, and is capable of performing all of its functions without disassembly or reassembly of any of its components, being operable in all respects by the tractor driver without leaving his seat.

Other objects are simplicity and economy of construction, and ease, convenience and efficiency of operation.

With these objects in view, as well as other objects which will appear in the course of the specification, reference will be had to the accompanying drawing, wherein:

FIG. 1 is a top plan view of a lawn edger attachment embodying the present invention, shown operatively mounted on a fragmentarily illustrated tractor, FIG. 2 is a side elevational view of the elements shown in FIG. 1, FIG. 3 is a fragmentary sectional view taken on line III—III of FIG. 1, FIG. 4 is an enlarged, fragmentary sectional view taken on line IV—IV of FIG. 1, showing details of the one-way clutch used in the operating linkage, FIG. 5 is an enlarged sectional view taken on line V—V of FIG. 4, FIG. 6 is an enlarged sectional view taken on line VI—VI of FIG. 2, and FIG. 7 is an enlarged, fragmentary sectional view taken on line VII—VII of FIG. 3.

Like reference numerals apply to similar parts throughout the several views, and the numeral 2 applies generally to a power driven tractor, the only element of the tractor shown being a side frame bar 4, which it will be understood is rigid relative to the tractor, and extends fore-and-aft of the tractor at one side thereof (the right side as illustrated) in spaced relation above the ground level 6 indicated in FIG. 2. The tractor normally moves forwardly in the direction of arrow 8 in FIG. 1.

The lawn edger forming the subject matter of the present invention includes a base member 10 on which all other elements of the edger are mounted. In this case, said base member constitutes a heavy angle iron mountable on frame bar 4 so that its flanges overlie the top and outer surfaces of said bar, and having a pair of spaced tongues 12 projecting beneath said bar. Intermediate said tongues, a normally vertical latch bar 14 is secured by bolt 16 to an ear 18 fixed to the top of base 10, and extends downwardly along the inner surface of bar 4, thereby securing the base member in rigid assembly with bar 4, as best shown in FIG. 6. By loosening bolt 16 and pivoting the latch bar, the base member is unlocked from the bar, and may be removed therefrom by pulling it laterally outwardly from said bar. Other tractors may of course require different mounting members.

Fixed in and extending horizontally outwardly from base member 10, adjacent the rearward end thereof, is a stub axle 20 (see FIG. 3) on which a sleeve 22 is rotatably mounted and retained. A clevis 24 is formed integrally with the outer end of said sleeve, and an elongated boom 26 is pivoted at its inner end in said clevis, as at 28, on an axis normal to axle 20. By virtue of this pivot, and the rotatability of sleeve 22 on axle 20, it will be seen that boom 26 may be pivoted universally relative to base member 10. Boom 26 normally extends forwardly and laterally outwardly from the tractor, as shown in FIG. 1. A rolling coulter blade 30, which constitutes a sharp-edged, concavoconvex disc, is disposed beneath the outer end of boom 26, being rotatably mounted, as at 32, in a carrier member 34 which is provided at its upper end, above the blade, with a vertical stub shaft 36 which is generally vertical and is journalled in boom 26 transversely thereto. A gauge wheel 31, of smaller diameter than the blade, is rigidly affixed to the blade concentrically thereto and in slightly spaced apart relation from the concave side of said blade. At its upper end, above the boom, shaft 36 is provided with a universal joint, shown schematically at 38, to the opposite side of which is connected the lower end of a control rod 40. Said control rod extends upwardly, rearwardly, and laterally inwardly relative to the tractor to a position convenient to the driver of the tractor, and is provided at its upper end with a T-handle 42. By turning said rod axially, shaft 36 may be turned to turn blade 30 on shaft 36.

Intermediate its ends, control rod 40 passes rotatably through a loosely fitting hole formed therefor in an ear 44 fixed to the upper end of a lever 46. Said lever extends generally downwardly and rearwardly, and is pivoted at its lower end, as at 48, to a plate 50 welded to sleeve 22 (see FIG. 7), for movement laterally of the tractor. In spaced relation above pivot 48, a horizontal link 52 is pivoted to the lever at 54 (see FIG. 7), then extends laterally outwardly and is pivoted at its outer end to boom 26 in spaced relation from boom pivot 28

(see FIG. 1), as at 56. Thus by grasping T-handle 42 and moving it from side to side, lever 46 is pivoted at 48, and acts through link 52 to pivot boom 26 from side to side on pivot 28. Also, by pulling T-handle 42 rearwardly, or allowing it to move forwardly, lever 46 acts as a strut, and boom 26 may be pivoted vertically by turning sleeve 22 on axle 20, so as to raise or lower blade 30.

A crank 58 is affixed to sleeve 22, extends upwardly therefrom, and has the rearward end of a compound link indicated generally by the numeral 60 pivoted to the upper end thereof as at 62, said link to be described in greater detail hereinbelow. Link 60 is pivoted at its forward end, as at 64, to the upper end of a shorter crank 66 which is fixed at its lower end to a horizontal, transversely extending shaft 68 which is journalled in a pair of upstanding ears 70 affixed to base 10 at its forward end. Affixed to shaft 68 inwardly of base 10 is an upwardly and rearwardly inclined lever 72, and a foot pedal 74 is pivoted at its upper end, as at 76, to the upper end of said lever, also on a horizontal, transverse axis. Foot pedal 74 is disposed in a position convenient to the tractor driver. When he presses forwardly on the pedal, a stop 78 on the lever arrests relative movement of the pedal relative thereto, so that further forward movement of the pedal also turns said lever and crank 66, which in turn acts through compound link 60, crank 58 and boom 26 to press blade 30 downwardly. Just before link 60 reaches a dead-center position, that is, just before the axis of said link passes below the axis of crank shaft 68, pedal 74 is engaged by a stop 80 fixed in an extension 82 of base 10, at a point below the pedal pivot 76. This arrests further movement of that point of the pedal, but further toe pressure on the upper part of the pedal permits it to continue movement of lever 72 to achieve the dead-center position described, during which movement the pedal pivots around stop 80 and moves away from stop 78. When crank 66 moves slightly past the dead-center position, a stop 85 formed therewith engages link 60 to arrest movement thereof, and the linkage is locked with blade 30 in a lowered position. When it is desired to release the blade for vertical movement, heel pressure on the lower portion of the pedal will pivot said pedal around stop 80 to raise lever 72, and crank 66, above the dead-center position.

The pedal, crank and link mechanism described provides a considerable mechanical advantage in forcing the blade 30 into the ground, ample in virtually all circumstances, the mechanical advantage resulting from the relatively great length of lever 72 as compared to that of crank 66, and the relatively short length of crank 66 as compared to that of crank 58. However, it will also be apparent that this advantage is available only in a relatively short vertical travel of the blade, when link 66 is approaching its dead-center position. It will also be apparent that while the ground-penetrating movement of the blade starts when the blade rests at the same elevation as the tractor wheels, as indicated in FIG. 2, when the tractor is running at the grass side of the division line 84 between the grass and pavement (see FIG. 1), it nevertheless must begin its ground-penetrating movement at a much higher elevation relative to the tractor when the tractor is running on the pavement, and the pavement is sunk below the grass level by the height of a curbing, perhaps six inches or more, and the link 60 would not then be of the proper length to begin the ground penetration at this higher elevation. To correct this condition, link 60 is made automatically adjustable in length. Said link is compound, consisting of a rod 86 pivoted at one end to crank 58 at 62, and passing slidably through the housing 88 of a one-way clutch indicated generally by the numeral 90. Said housing is in turn welded to a link member 92 pivoted at its distal end to crank 66 at 64. Within the interior of housing 88, rod 86 passes through slightly oversized holes in a series of thin plates 94 carried loosely in the housing. Plates 94 are formed of hardened steel, and the edges thereof encircling rod 86 are sharp. When rod 86 is moved longitudinally by manipulation of control rod handle 42, it slides freely through plates 94, but when clutch housing 90 is moved longitudinally by pressure on foot pedal 74, an internal inclined end wall 96 of the housing engages and tilts plates 94 to cause the sharp edges thereof encircling rod 86 to bite into said rod, so that further movement of the housing by the pedal pulls rod 86 with it. A forwardly and rearwardly extending tension spring 98 attached at its forward end to link member 92 and at its rearward end to an upstanding post 100 affixed to base 10 serves to maintain clutch housing 88 stationary and prevent engagement of the clutch so long as there is no pressure on pedal 74, and a stop screw 102 mounted in the clutch housing serves to prevent reverse tilting of plates 94. This type of clutch, often denoted a "pony clamp", is of course only exemplary of various types of one-way clutches which could be utilized. An "eye" member 104 affixed to boom 26 adjacent its outer end is adapted to be engaged over a hanger rod 106 affixed to base 10, when said boom is elevated to a position higher than any it is required to attain when in actual use, for easy transport of the edger.

To prepare the edger for use, base 10 is mounted on the tractor frame bar 4 as shown and described, and blade 30 is suspended in an elevated position by engaging eye member 104 over hanger bar 106. The tractor operator then positions the tractor to move in a direction parallel to the division line 84 between the grass and a paved area, at either side of said line, as may be convenient or desired in any particular situation, at a lateral distance from said line within the range of lateral adjustment of blade 30 as provided by the horizontal pivotability of boom 26. Then, grasping T-handle 42 while removing his foot from pedal 74, the operator pulls said handle rearwardly to free eye 104 from hanger 106, and pushes the handle outwardly to pivot boom 26 laterally until blade 30 is disposed directly over line 84, while turning the handle axially to rotate blade 30 on its shaft 36 to dispose said blade in a substantially vertical plane directly above line 84. For reasons which will presently appear, the convex side of the blade should always be turned to face the grass side of the line, and its concave side to face the pavement side of the line. This orientation of the blade will be reversed depending on whether the tractor is running on the grass or on the pavement, and may be very simply reversed by turning handle 42 axially. By then allowing handle 42 to move forwardly, the blade is lowered to rest on the earth surface at line 84, its concave side against the edge of the pavement. During the above adjustments, any vertical movement of the blade is accompanied by free sliding movement of rod 86 of link 60 through housing 88 of one-way clutch 90, since said clutch is disengaged at this time, there being no pressure on foot pedal 74. However, when the operator then places his foot on pedal 74 and presses forwardly, clutch housing 88 is moved forwardly, and the clutch immediately engages, whereby to act through rod 86, crank 58 and boom 26 to press blade 30 into the ground, as indicated at 30A in FIG. 2, and to lock it in this position when link 60 passes its dead-center position relative to crank 66, as previously described. The parts may be so proportioned that the pedal actuated lowering of the blade produces a desired penetration of the blade into the ground, say for example three inches. Gauge wheel 31 then rides directly on the pavement, as indicated in FIG. 2 at position 30A of the blade, and thereby prevents accidental excessive penetration of the blade. It will be obvious that pedal operation of the blade may in some cases be required to start with the blade at a higher elevation relative to the tractor, for example at the position indicated at 30B in FIG. 2, if the tractor is running on pavement lower than the grass area by the height of a curbing or the like. Clutch housing 88 will then occupy a different position along the length of link rod 86, but the clutch will still engage automatically at that point whenever the pedal is pressed. Ample force for ground penetration is supplied by the linkage shown, even enough force to tilt the entire tractor if pedal 74 is pressed with the blade resting on pavement.

When the tractor is then driven forwardly, blade 30 will roll on its rotational axis, severing grass, and soil, which may extend across division line 84. As previously mentioned, it is important that the convex face of the blade be facing the grass side of line 84 during movement of the edger. This relationship provides that the blade will press the soil away from the pavement edge, forming an open groove therebetween which is considered to provide any lawn with a neater, more "tailored" appearance. More importantly, it also provides that the pressure of the soil against the convex face of the blade furnishes a continuous force, transverse to the plane of the blade, biasing said blade against the edge of the pavement, so that it follows and remains in contact with the pavement edge even though the operator may not steer the tractor in a line perfectly parallel to line 84. Such accuracy of steering is in any event very difficult to maintain. In the present device, any variation in the lateral spacing between the blade and the centerline of the tractor will be accompanied by lateral pivoting of boom 26, and by a slight rotation of the blade on its vertical shaft 36, to maintain its plane parallel to line 84, and the force for both of these movements is supplied by the pressure of the blade against the pavement edge, so that the blade follows the pavement edge accurately despite substantial inaccuracies in the steering of the tractor. When the end of a run of edging is reached, heel pressure applied to pedal 74 by the operator will break the dead-center relation of link 60 to crank 66, and the blade may be elevated for transport by engaging eye 104 over hanger 106 by manipulation of handle 42. The grass and soil severed by the edger may then be disposed of by sweeping or otherwise.

While we have shown and described a specific embodiment of our invention, it will be readily apparent that many minor changes of structure and operation could be made without departing from the spirit of the invention.

What we claim as new and desire to protect by Letters Patent is:

1. A lawn edger attachment for tractors comprising:
   a. a base member,
   b. means for attaching said base member rigidly but removably to said tractor,
   c. an elongated boom universally pivoted at one end to said base member for both horizontal and vertical pivotal movement, and normally extending laterally outwardly from said tractor at an acute angle to the line of travel of the tractor,
   d. a circular, generally planar cutting blade of concave-convex circular dish form disposed beneath the extended end of said boom in a generally vertical plane, being mounted on said boom both for rotation on its own horizontal axis and for rotation about a generally vertical axis relative to said boom, and
   e. manual operating means operable to pivot said boom, whereby said boom may be pivoted horizontally to position said blade directly over the division line between a grass area and a paved area parallel to the line of travel of the tractor, and may be pivoted vertically to lower said blade into ground contact at said division line, and further pressed into penetrating relation with the ground, whereby to sever any grass and soil extending over said division line as the tractor is driven parallel to said division line, the convex face of said blade facing the grass side of said division line, whereby soil pressure exerted on said convex face during tractor movement will pivot said boom horizontally to maintain said blade against the pavement edge despite variations in the transverse spacing of the tractor from the division line, and will also pivot said blade on its vertical axis relative to the boom to maintain the plane of the blade parallel to the division line, said manual operating means being operable to turn said blade on its vertical axis, whereby the convex face of said blade may be turned to face the grass side of said division line regardless of side of said division line at which the tractor may be positioned.

2. A lawn edger attachment for tractor comprising:
   a. a base member,
   b. means for attaching said base member rigidly but removably to said tractor,
   c. an elongated boom universally pivoted at one end to said base member for both horizontal and vertical pivotal movement, and normally extending laterally outwardly from said tractor at an acute angle to the line of travel of the tractor,
   d. a circular, generally planar cutting blade disposed beneath the extended end of said boom in a generally vertical plane, being mounted on said boom both for rotation on its own horizontal axis and for rotation about a generally vertical axis relative to said boom, and
   e. manual operating means operable to pivot said boom, whereby said boom may be pivoted horizontally to position said blade directly over the division line between a grass area and a paved area parallel to the line of travel of the tractor, and may be pivoted vertically to lower said blade into ground contact at said division line, and further pressed into penetrating relation with the ground, whereby to sever any grass and soil extending over said division line as the tractor is driven parallel to said division line, said manual operating means comprising:
      (1) a lever pivoted at one end to an element movable with said boom as said boom is pivoted vertically, said lever being horizontally movable in a direction generally normal to said boom, and extending to a position convenient to the operator of the tractor, (2) a link pivoted at one end to said lever in spaced relation from the pivot of said lever, and at its opposite end to said boom in spaced relation from its universal pivot, whereby by moving said lever from side to side the operator may pivot the boom horizontally, and by moving said lever forwardly and rearwardly may pivot the boom vertically, and (3) a control rod universally pivoted at one end to said blade through its vertical rotatable connection to said boom, said control rod having a handle at its opposite end in a position convenient to the operator of the tractor, whereby by turning said control rod axially the operator may turn said blade about its vertical axis.

3. A lawn edger attachment as recited in claim 2 wherein said lever and said control rod intersect angularly remotely from their connections to said boom and said blade, said control rod having an axially rotatable and slidable, but transversely restrained connection to said lever, whereby by moving the handle of said control rod laterally, the operator may pivot said boom horizontally, by moving it forwardly or rearwardly may pivot said boom vertically, and by turning it axially may turn said blade about its vertical axis relative to said boom.

4. A lawn edger attachment as recited in claim 2 wherein said manual operating means additionally includes:
  a. a foot pedal carried pivotally by said base member,
  b. a linkage interconnecting said foot pedal to said boom whereby pressure on said pedal will pivot said boom downwardly, said linkage supplying a substantial mechanical advantage multiplying the pedal pressure to assist said blade to penetrate downwardly into the ground, and
  c. automatic means whereby said linkage is rendered inoperative in response to movement of said lever, and operative in response to pressure on said pedal, whereby said foot pedal may be actuated to lower said boom only after said blade has been lowered into engagement with the ground surface.

5. A lawn edger attachment as recited in claim 4 wherein said linkage includes a compound link operable in tension to lower said boom, said link consisting of two axially aligned sections which are normally relatively slidable longitudinally, and wherein said automatic means comprises a one-way clutch operable when engaged to secure said link sections against relative longitudinal movement, said clutch being normally disengaged and non-engageable by axial movement of the link section attached to said boom, as occurs during movement of said boom by manual operation of said lever, but automatically engageable responsively to longitudinal movement of the link section connected to said pedal when pressure is applied to said pedal.

6. A lawn edger attachment as recited in claim 4 wherein said linkage includes a crank rotatable by pressure on said foot pedal, and a link pivoted to the free end of said crank, said link being operable to pass through a dead-center position relative to said crank when said boom, and the blade carried thereby, have been lowered to the full extent provided by said foot pedal, whereby said boom and said blade are locked in said lowered position, and pressure on said pedal may be relaxed.

7. A lawn edger attachment as recited in claim 6 wherein said linkage includes an upwardly extending crank operable by movement thereof to lower said boom and blade, the upper end of said foot pedal being pivoted to the free upper end of said crank on a horizontal transverse axis and having limited pivotal movement relative to said crank, whereby downward pressure thereon will turn said crank, and a stop mounted on said base and positioned to engage said pedal, at a point spaced downwardly from its pivotal connection to said crank, just before said link reaches said dead-center position, whereby as movement of said crank is continued by toe pressure on the upper portion of said pedal to move said link to and past said dead-center position to lock said boom and blade in a lowered position, said foot pedal is pivoted in a reverse direction relative to its pivot by said stop, and whereby when heel pressure is applied to the lower portion of said pedal, said stop will pivot said pedal in a reverse direction, whereby to pivot said crank in a direction to break and release said dead-center lock.

8. A lawn edger attachment for tractors comprising:
a. a base member,
b. means for attaching said base member rigidly but removably to said tractor,
c. an elongated boom universally pivoted at one end to said base member for both horizontal and vertical pivotal movement, and normally extending laterally outwardly from said tractor at an acute angle to the line of travel of the tractor,
d. a circular, generally planar cutting blade disposed beneath the free end of said boom in a generally vertical plane, being mounted on said boom both for rotation on its own horizontal axis and for rotation about a generally vertical axis relative to said boom, and
e. manual operating means operable to pivot said boom, whereby said boom may be pivoted horizontally to position said blade directly over the division line between a grass area and a paved area parallel to the line of travel of the tractor, and may be pivoted vertically to lower said blade into ground contact at said division line, and further pressed into penetrating relation with the ground, whereby to sever any grass and soil extending over said division line as the tractor is driven parallel to said division line, said manual operating means comprising:
  (1) a lever connected at its lower end to said boom and extending upwardly to a position conveniently accessible to the operator of the tractor, whereby the operator may pivot the boom laterally by moving said lever from side to side, and vertically by moving said lever forwardly and rearwardly,
  (2) a foot pedal carried pivotally by said base member and conveniently accessible to the tractor operator,
  (3) a linkage interconnecting said foot pedal to said boom whereby pressure on said pedal will pivot said boom downwardly, but not horizontally, said linkage supplying a substantially mechanical advantage multiplying the pedal pressure to assist said blade to penetrate downwardly into the ground, and
  (4) automatic means whereby said linkage is rendered inoperative in response to movement of said lever, and operative in response to pressure on said pedal, whereby said pedal may be actuated to lower said boom only after said blade has been lowered into engagement with the ground surface.

9. A lawn edger as recited in claim 8 wherein said linkage includes a compound link operable in tension to lower said boom, said link consisting of two axially aligned sections which are normally relatively slidable longitudinally, and wherein said automtic means comprises a one way clutch operable when engaged to secure said link sections against relative longitudinal movement, said clutch being normally disengaged and non-engageable by axial movement of the link section attached to said boom, as occurs during movement of said boom by manual operation of said lever, but automatically engageable responsively to longitudinal movement of the link section connected to said pedal when pressure is applied to said pedal.

10. A lawn edger attachment as recited in claim 8 wherein said linkage includes a crack rotatable by pressure on said foot pedal, and a link pivoted to the free end of said crank, said link being operable to pass through a dead-center position relative to said crank when said boom, and the blade carried thereby, have been lowered to the full extent provided by said foot pedal, whereby said boom and said blade are locked in said lowered position, and pressure on said pedal may be relaxed.

11. A lawn edger as recited in claim 10 wherein said linkage includes an upwardly extending crank operable by movement thereof to lower said boom and blade, the upper end of said foot pedal being pivoted to the free upper end of said crank on a horizontal transverse axis and having limited pivotal movement relative to said crank, whereby downward pressure thereon will turn said crank, and a stop mounted on said base and positioned to engage said pedal, at a point spaced downwardly from its pivotal connection to said crank, just before said link reaches said dead-center position, whereby as movement of said crank is continued by toe pressure on the upper portion of said pedal to move said link to and past said dead-center position to lock said boom and blade in a lowered position, said foot pedal is pivoted in a reverse direction relative to its pivot by said stop, and whereby when heel pressure is applied to the lower portion of said pedal, said stop will pivot said pedal in a reverse direction, whereby to pivot said crank in a direction to break and release said dead-center lock.

* * * * *